United States Patent
Chang et al.

(10) Patent No.: US 8,305,895 B2
(45) Date of Patent: Nov. 6, 2012

(54) ADAPTIVE CROSS-NETWORK MESSAGE BANDWIDTH ALLOCATION BY MESSAGE SERVERS

(75) Inventors: Steve Chen-Lin Chang, Cupertino, CA (US); Shyyunn Sheran Lin, San Jose, CA (US); Junekang Yang, Palo Alto, CA (US); Jianbin Zhao, Saratoga, CA (US); Ludwig Alexander Clemm, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 544 days.

(21) Appl. No.: 11/691,385

(22) Filed: Mar. 26, 2007

(65) Prior Publication Data

US 2008/0239955 A1 Oct. 2, 2008

(51) Int. Cl.
*G06F 11/00* (2006.01)
(52) U.S. Cl. ......... 370/232; 370/230; 370/231; 370/235
(58) Field of Classification Search ............... 370/232, 370/233, 235, 395.4, 468, 352
See application file for complete search history.

(56) References Cited

U.S. PATENT DOCUMENTS

| | | | | |
|---|---|---|---|---|
| 6,098,123 A * | 8/2000 | Olnowich | | 710/41 |
| 6,243,391 B1 * | 6/2001 | Holmquist | | 370/458 |
| 6,292,465 B1 * | 9/2001 | Vaid et al. | | 370/230 |
| 6,442,138 B1 * | 8/2002 | Yin et al. | | 370/232 |
| 6,519,264 B1 * | 2/2003 | Carr et al. | | 370/449 |
| 6,560,243 B1 * | 5/2003 | Mogul | | 370/468 |
| 6,647,419 B1 * | 11/2003 | Mogul | | 709/226 |
| 7,184,538 B1 * | 2/2007 | Doskow et al. | | 379/221.1 |
| 7,426,181 B1 * | 9/2008 | Feroz et al. | | 370/232 |
| 7,430,209 B2 * | 9/2008 | Porter | | 370/395.4 |
| 2003/0185155 A1 * | 10/2003 | Huang et al. | | 370/235 |
| 2004/0160945 A1 * | 8/2004 | Dong et al. | | 370/352 |
| 2005/0066008 A1 * | 3/2005 | Sikora et al. | | 709/206 |
| 2005/0254519 A1 * | 11/2005 | Beukema et al. | | 370/468 |
| 2008/0028083 A1 * | 1/2008 | Rezvani et al. | | 709/229 |
| 2008/0040504 A1 * | 2/2008 | You | | 709/238 |
| 2008/0104229 A1 * | 5/2008 | Cowham | | 709/224 |

* cited by examiner

*Primary Examiner* — Ricky Ngo
*Assistant Examiner* — Rasheed Gidado
(74) *Attorney, Agent, or Firm* — Schwegman, Lundberg & Woessner, P.A.

(57) ABSTRACT

In one embodiment, a network device is described as including a rate monitor to monitor an actual individual message rate of event messages sent from each one of a plurality of sending devices operatively in communication with the network device, an allocator to allocate an individual message rate limit to each of the plurality of sending devices, and a communication module to communicate a rate limit instruction to at least one of the sending devices, the rate limit instruction to limit the transmission rate of event messages.

18 Claims, 11 Drawing Sheets

ADAPTIVE CROSS-NETWORK MESSAGE BANDWIDTH ALLOCATION BY MESSAGE SERVERS

FIELD

This application relates to a system and method for configuring a server, specifically to allocate, and re-allocate a syslog message rate budget.

BACKGROUND

The system log (syslog) protocol is a protocol that allows for an event-based logging service over a network. Using this protocol, a syslog sender (e.g., a device such as a router operatively coupled to a syslog server) transmits small text based messages (e.g., messages usually less than 1024 bytes) to a syslog server providing information in the form of data logging, system status information, and other information related to the health of a network.

BRIEF DESCRIPTION OF DRAWINGS

The present invention is illustrated by way of example and not limitation in the figures of the accompanying drawings, in which like references indicate similar elements and in which.

DESCRIPTION OF EXAMPLE EMBODIMENTS

Figure 1:
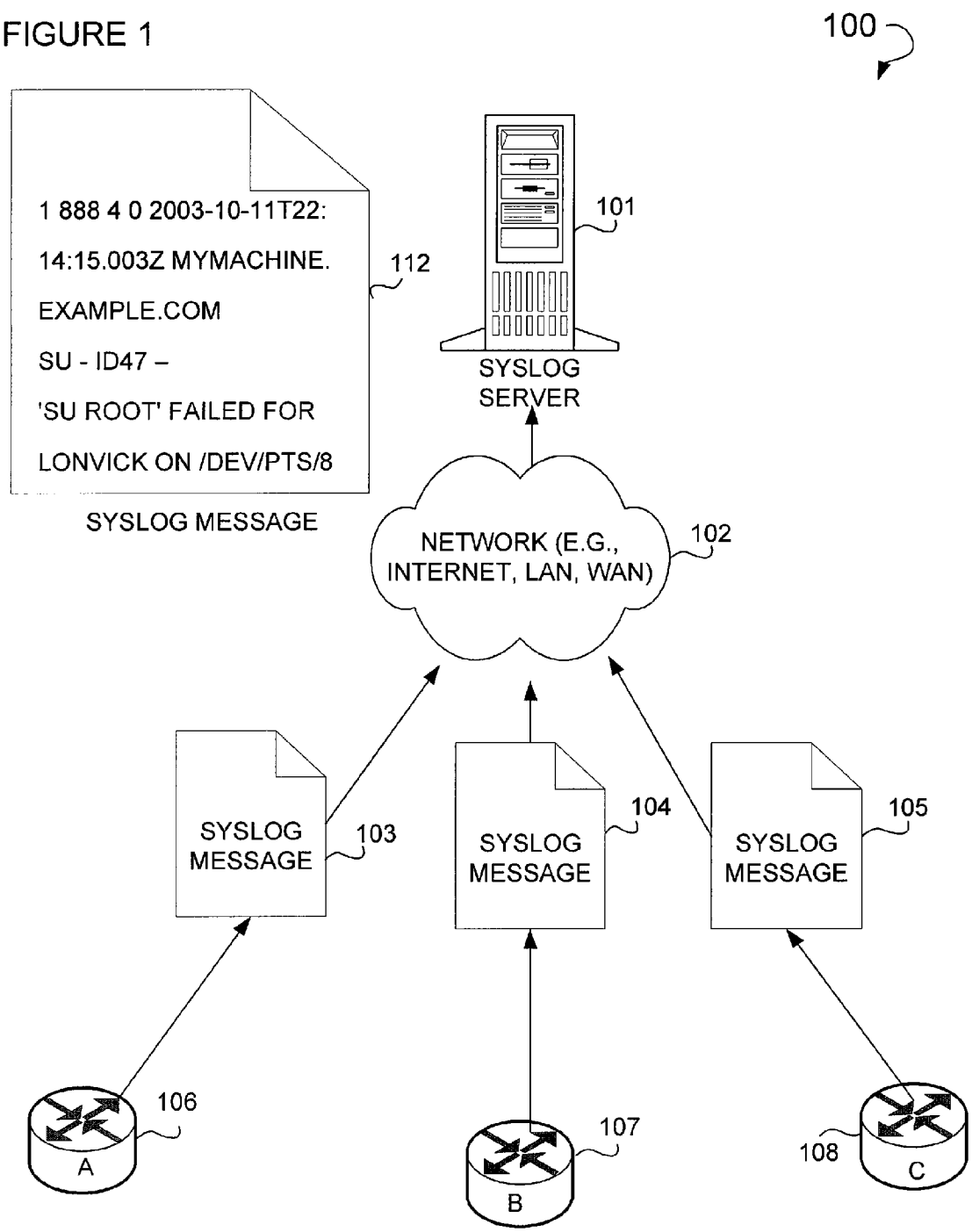
FIG. 1 is a diagram illustrating an example system log network.

In the following description, for purposes of explanation, numerous specific details are set forth in order to provide a thorough understanding of an embodiment of the present invention. It may be evident, however, to one skilled in the art that the present invention may be practiced without these specific details.

Overview

In one embodiment, a network device is described as including a rate monitor to monitor an actual individual message rate of event messages sent from each one of a plurality of sending devices operatively in communication with the network device, an allocator to allocate an individual message rate limit to each of the plurality of sending devices, and a communication module to communicate a rate limit instruction to at least one of the sending devices, the rate limit instruction to limit the transmission rate of event messages.

General Case—Budget allocation and Re-Allocation within a Syslog System

Syslog networks are networks that monitor other networks, wherein the syslog protocol is the chosen manner in which information about the network being monitored is formatted. As with other networks, a syslog network may be overwhelmed by excessive messages (e.g., network traffic, or more specifically a plurality of event messages) such that the one or more syslog servers that manage the syslog network may be crashed or may drop syslog messages. Even in cases where a syslog server does not crash or drop messages due to excessive traffic, they may be so slowed by excessive traffic that they are no longer effective. One way in which a syslog server may be crashed due to excessive traffic is in those instances where a buffer allocated for a device sending syslog messages to the syslog server has been exceeded. Where such a buffer is exceeded, and either insufficient memory space exists to allocate a new, larger buffer, and/or the buffer is exceeded, the syslog server may malfunction and stop working, or drop all further incoming syslog messages until the traffic level drops to a level that an existing buffer can accommodate.

In some embodiments, a system is described that provides allocation of message bandwidth (e.g., a bandwidth budget or budget) to sources of event messages sent to that system. These sources include devices such as routers or other sending devices capable of sending syslog messages. In some cases, a message server is fully responsible for operating within its budgeted system resource in processing the large volume of incoming logging messages (e.g., syslog messages), and at the same time allows a message server to be in command of rebalancing a per session rate limit set at the device side. In one specific embodiment, this system may be a syslog server that assigns and adjusts syslog message rate limits (e.g., individual message rate limits) of devices sending syslog messages. Put another way, message rate limits may be configured (e.g., throttled or controlled) by devices, but managed a syslog server. By dynamically and adaptively allocating and rebalancing message rate limits at device side (e.g., the side generating the messages), while maintaining its budgeted message processing capacity not being overloaded, a syslog server maximizes the likelihood that the most relevant messages, on a network-wide basis, not just of individual systems, may always be delivered and not be dropped, even in the event of overload conditions.

In some embodiments, the syslog server enables devices to generally send messages beyond the rate they would otherwise be permitted to, which results, for example, in more logging messages being preserved instead of being discarded that can facilitate, for example, diagnosis or root cause analysis. Some example embodiments may include a message server having a certain processing capacity that allows it to process incoming messages at a certain rate (e.g., a global message rate budget). In order to avoid being overloaded, which could lead to indiscriminate dropping of messages in certain scenarios, message senders (e.g., devices) are configured to not exceed a certain message rate (e.g., a local message rate budget). The global message rate budget may be, in effect, distributed over all the message senders, who are each given their own local message rate budget. While it is possible to over subscribe or over allocate local message rate budgets, this has obvious drawbacks, so that generally the equation holds that the sum of local message rate budgets equals the global message rate budget. In some embodiments, the global budget might be divided up equally amongst the various message sources, or it could be determined according to some other criteria or algorithm. Some systems may end up needing to emit more events than others (e.g., being in a part of a network that experiences more "distress" than other parts of the network).

In some embodiments, the message server observes the rate at which incoming messages are sent from individual devices or systems. If it is observed that a message rate from one system is consistently relatively high, and approaching its assigned local message rate budget, while at the same time the message rate from other systems is consistently low relative to their assigned budgets, the message server may decide to increase the budget (e.g., raise the rate limit) of the one system and "paying for it" by taking away from the budget of the other system so that the global budget remains balanced.

FIG. 1 is a diagram illustrating an example syslog network 100. Illustrated is a syslog server 101 operatively coupled to a network 102, wherein the network 102 can be an Internet, Local Area Network (LAN), Wide Area Network (WAN), or some other suitable network. This network 102 may, in some cases, receive a syslog message 103, 104, or 105 from one or more routers such as, for example, a router A 106, a router B 107 or a router C 108. Syslog message 112 illustrates the type of message that one of these routers A 106, B 107 or C 108 may send via the network 102 to the syslog server 101.

In some embodiments, a system and method to dynamically monitor, and allocate and reallocate a syslog message rate budget is described. Allocation and reallocation is determined, in part, through the use of an instruction set provided to a syslog server. This instruction set provides information relating to, among other thing, a list of devices operatively coupled to and managed by the syslog server, an initial buffer size to be allocated for each of these devices, a threshold limit value beyond which reallocation of bandwidth needs to occur, and a rate limit that is actually increased or decreased where reallocation occurs. This instruction set, the various parameters that it contains, and the method by which allocation and reallocation occurs is more fully described below. These devices may, for example, be one or more routers running an Internetwork Operating System (IOS), or some other suitable computer system and operating system.

Figure 2:
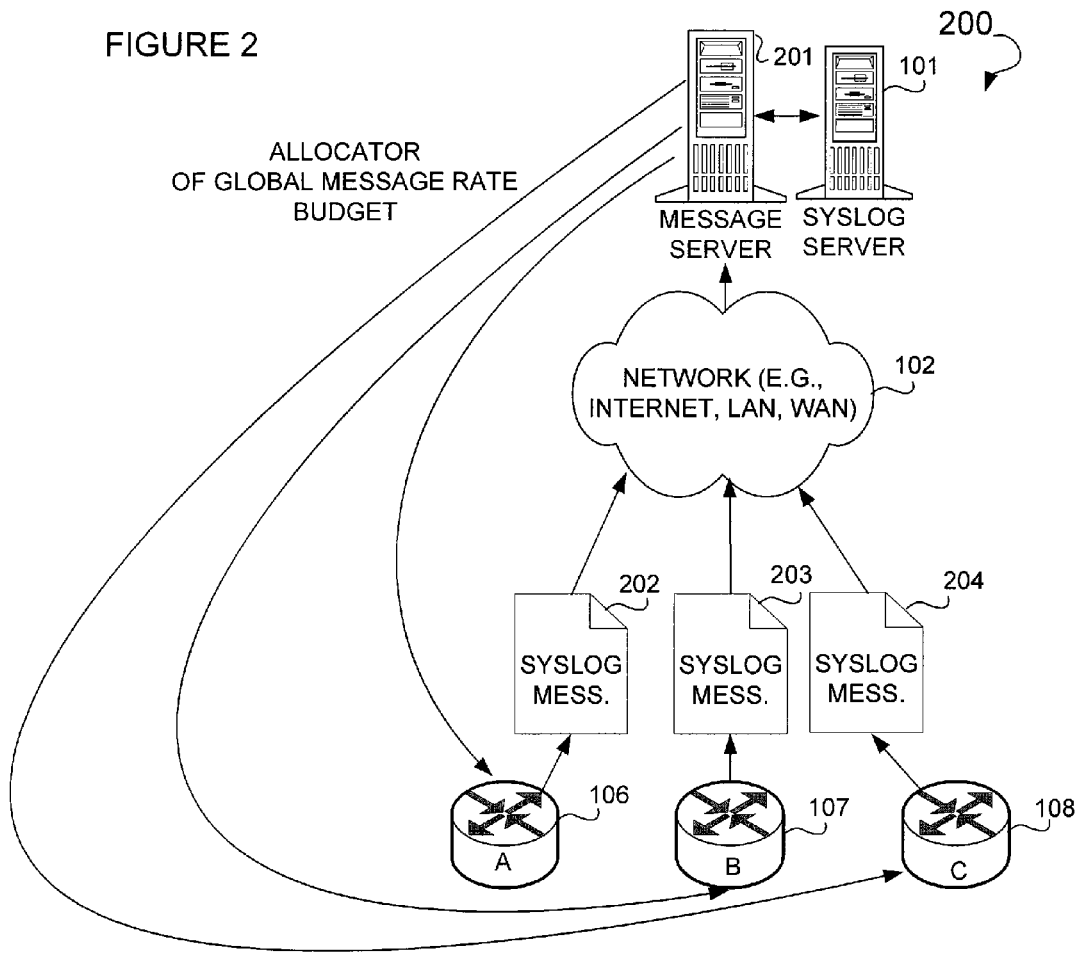
FIG. 2 is a diagram illustrating an example syslog messaging system.

FIG. 2 is a diagram illustrating an example syslog messaging system 200. Illustrated is a syslog server 101 operatively coupled to a message server 201. This message server 201 is, in turn, operatively coupled to a network 102 wherein the network 102 receives syslog messages 202, 203, 204 from router A 106, router B 107, and router C 108. In some embodiments, the syslog server 101 allocates a bandwidth budget to each of the routers A 106, B 107, and C 108. This budget once allocated may be reallocated where certain conditions are met including the exceeding of some threshold bandwidth value as may be described below.

Figure 3:
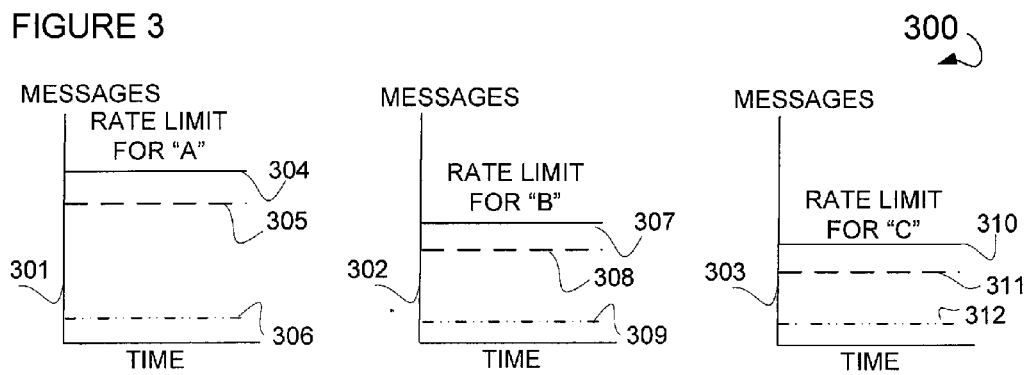
FIG. 3 is a schematic illustrating various example graphs representing the syslog budget usage for each of the routers A, B, and C.

FIG. 3 is a schematic 300 illustrating various example graphs representing the syslog budget usage for each of the routers A 106, router B 107, and router C 108. Illustrated is a graph 301 of messages over time describing an actual rate 306, a threshold rate 305 and a rate limit 304. This graph 301 corresponds to the router A 106. Further illustrated is a graph 302 of messages over time describing an actual rate 309, a threshold limit 308 and a bandwidth rate limit 307. This graph corresponds to or reflects the bandwidth usage and budget for router B 107. Additionally, described is a graph 303 illustrating messages over time where an actual rate 312 is depicted along with a threshold limit 311 and a rate limit 310. This graph 303 corresponds to router C 108. The actual rates (e.g., 306, 309, and 312) reflect the actual traffic rates for syslog traffic being sent from a device (e.g., 106, 107, and 108) to a syslog server (e.g., 101), or to a message server (e.g., 201). The threshold rates (e.g., 305, 308, and 311) reflect values used to set a limit for the syslog server 101 or message server 201 beyond which reallocation may occur for the devices (e.g., 106, 107, or 108) operatively coupled to the syslog server (e.g., 101) or message server (e.g., 201). The rate limit (e.g., 304, 307, and 310) values reflect the limits used to, in some embodiments, configure a device (e.g., 106, 107, or 108), or otherwise allocated a global budget on the syslog server 101 or message server 201 among the devices operatively coupled to the syslog server (e.g., 101) or message server (e.g., 201). As a practical matter, this allocation of a budget may be in the form of an allocating/reallocating memory buffer space for each of the devices (e.g., 106, 107, and 108) (see e.g., FIG. 8 below).

In some embodiments, by setting rate limits too high, a syslog server overload may occur wherein the syslog server may be exposed to too much traffic. However, in some cases, by setting the rate limit too low, the syslog server, and associated system, may become under utilized such that a device cannot send important log messages due to the low rate limit assigned to the device.

Figure 4:
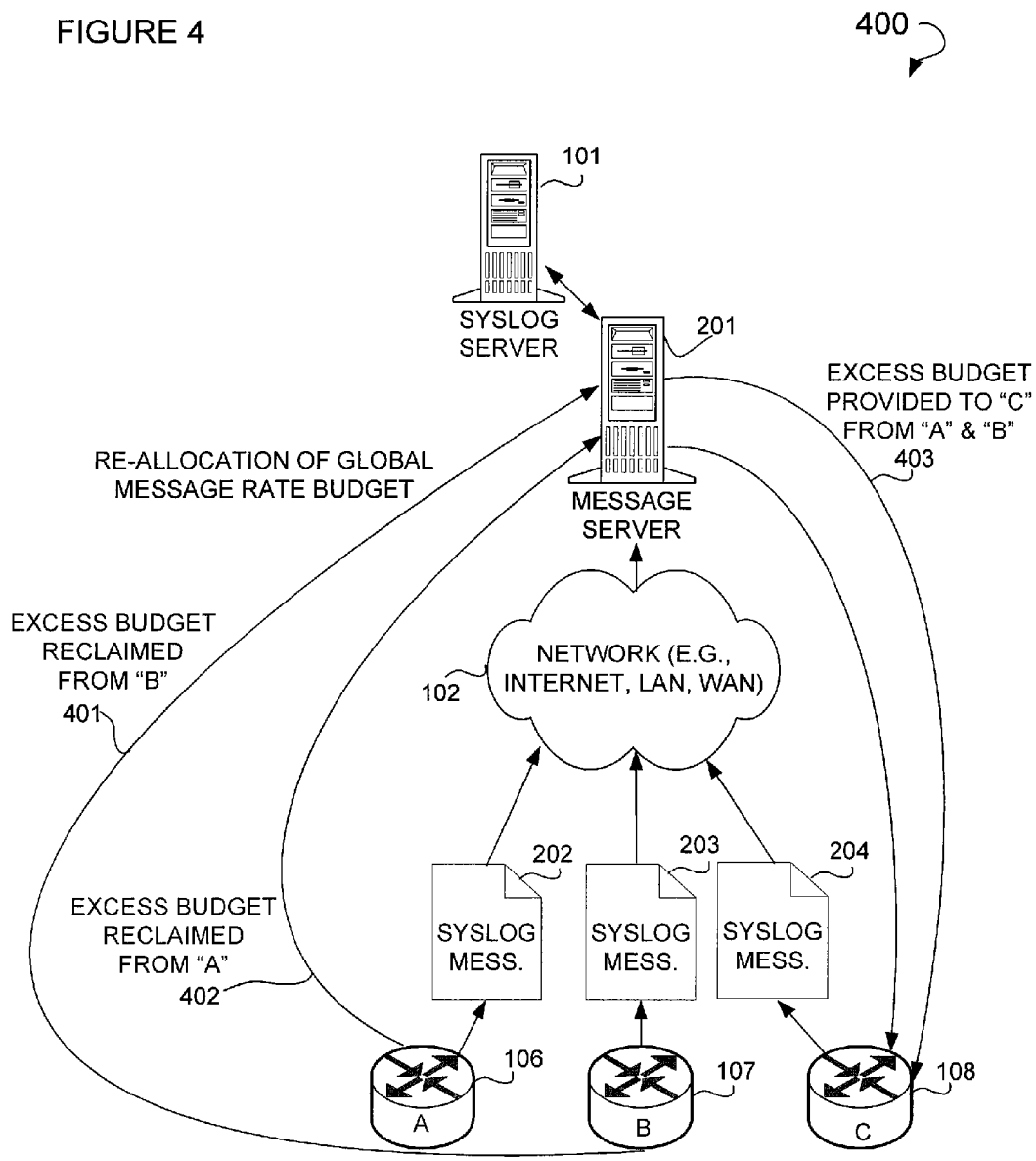
FIG. 4 is a diagram illustrating an example system for reallocating a global message rate budget or syslog budget.

FIG. 4 is a diagram illustrating an example system 400 for reallocating a global message rate budget or syslog budget. Illustrated is a syslog server 101 operatively coupled to a message server 201 this message server 201 will, in some embodiments, receive message traffic from the router A 106, router B 107, and router C 108. In certain cases where a threshold limit is previously described is equal to or less than an actual rate, then the syslog server 101 utilizing the message server 201 may engage in a reallocation of the syslog budget for the entire system. For example, where router A 106 and router B 107 have excess budget, while router C 108 is in need of additional budget due to an increase in the actual rate that is greater than or equal to the threshold limit for the router C 108, excess budget may be reclaimed from A and B as depicted in 402 and 401. This excess budget may be provided from A and B to C, as depicted in 403.

Figure 5:
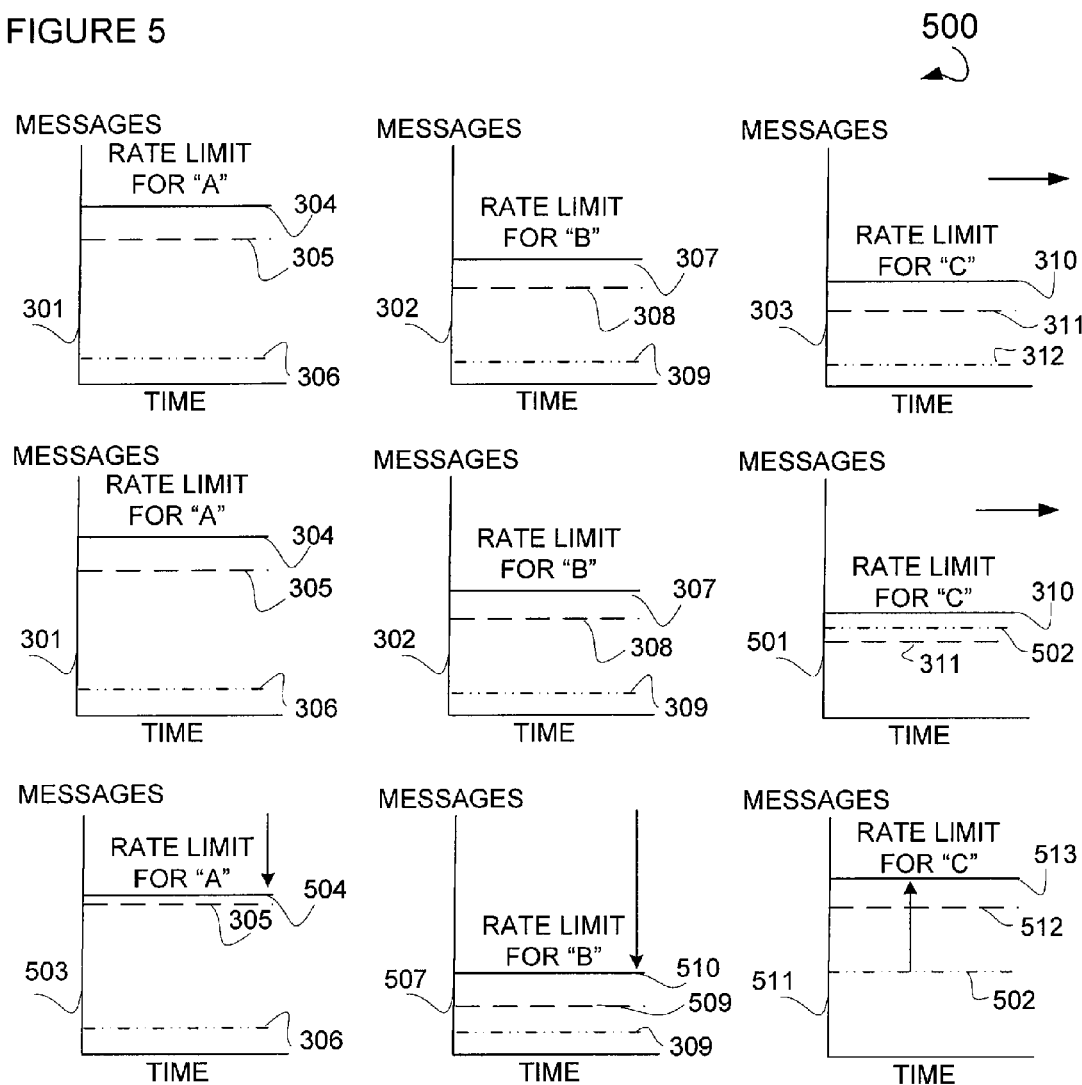
FIG. 5 is a schematic illustrating the example syslog bandwidth traffic for a router A, a router B, and a router C.

FIG. 5 is a schematic 500 illustrating the example syslog bandwidth traffic for the router A 106, the router B 107, and the router C 108, and rate limit configuration/re-configuration on the device side. Illustrated is a graph 501 of messages over time wherein the actual rate 502 has exceeded the threshold rate limit 311. In some embodiments, once the actual rate 502 exceeds the threshold rate limit 311, then a reallocation of the syslog budget for the entire system may occur. In some cases, the actual rate may only approach, but not exceed, the threshold rate limit (e.g., 311) so as to facilitate a reallocation of bandwidth (e.g., if the actual rate is within some predefined percentage value of the threshold rate limit, then reallocation may occur). The graph 503 of messages over time describes the reallocation of the syslog budget for router A 106 such that the rate limit 504 is decreased for this router A 106, where compared to the rates in graph 301. Similarly, graph 507 of messages over time describes the reallocation of the rate limit for router B 107. This reallocation occurs such that the rate limit 510 is reduced relative to its previous value as depicted by 307, as is the threshold rate limit 509 relative to the previously described threshold rate limit 308. Additionally illustrated is an increase in the rate limit wherein the reallocated budget from router A 106 and router B 107 is provided to router C 108. Graph 511 of messages over time describes an increased rate limit value 513, wherein the value for 513 is increased over the previously described rate limit value 310. Similarly, the threshold rate limit value 512 is also increased relative to its previous value 311.

A Method for Allocation and Reallocation of a Global Message Rate Budget within a Syslog System In some embodiments, a method for the allocation and reallocation of a global message rate budget within a syslog system is described. Broadly speaking this method can be thought of being composed of a number of sub-components or modules with differing functionality. At a high level, this method may have an allocation and optimization component, and a sampling component that determines the proper time to re-allocate (e.g., re-balance) the exist budget for a syslog messages.

Figure 6:
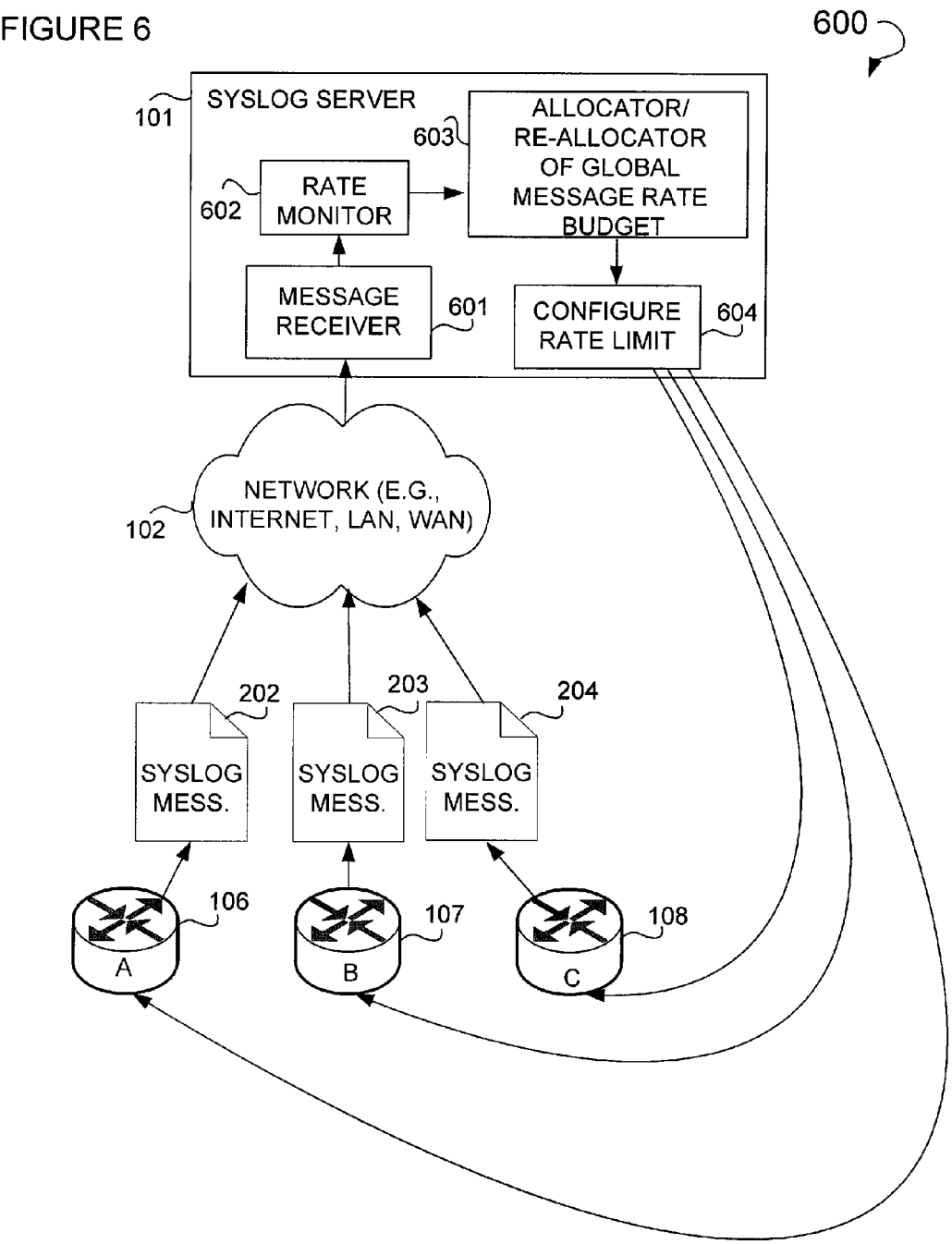
FIG. 6 is a block diagram describing some of the various example modules that are used to make up the syslog server.

FIG. 6 is a block diagram 600 describing some of the various example modules that are used to make up the syslog server 101. Illustrated is a module 601 that functions as a message receiver to receive syslog messages (e.g., syslog message 202, 203, 204) across a network 102. As previously described, these syslog messages 202, 203 and 204 are generated by, for example, a router A 106 or router B 107, and router C 108. Once the module 601 receives the previously described syslog messages, a module 602 monitors the rate at which these messages are received. As may be described below in greater detail, this rate monitor module 602 may implement a variety of different algorithms to engage in or to determine the rate at which syslog messages are received by the syslog server 101. Some of these methods may include a windowing method or some other suitable method. In some cases, the module 602 is operatively coupled to a module 603 that acts to allocate or reallocate the global message rate budget for the various devices (e.g., routers 106, 107, and 108) that may be operatively coupled to the syslog server 101. Once an allocation or reallocation of a global message rate budget occurs then, in some cases, a module 604 is executed that configures the rate limit for each of the devices that are operatively coupled to the syslog server 101, devices that generate syslog messages.

Some embodiments may include a network device comprising a rate monitor to monitor an actual individual message rate of event messages sent from each one of a plurality of sending devices operatively in communication with the network device, an allocator to allocate an individual message rate limit to each of the plurality of sending devices, and a communication module to communicate a rate limit instruction to at least one of the sending devices, the rate limit instruction to limit the transmission rate of event messages. In some cases, this network device may be a router, server, computer system or other suitable device capable of receiving event messages such as syslog messages. This rate monitor may be a rate monitor such as the previously described rate monitor 602. The allocator may be an allocator such as the above described allocator/re-allocator 603, while the communications module may be a configure rate limit module 604.

Figure 7:
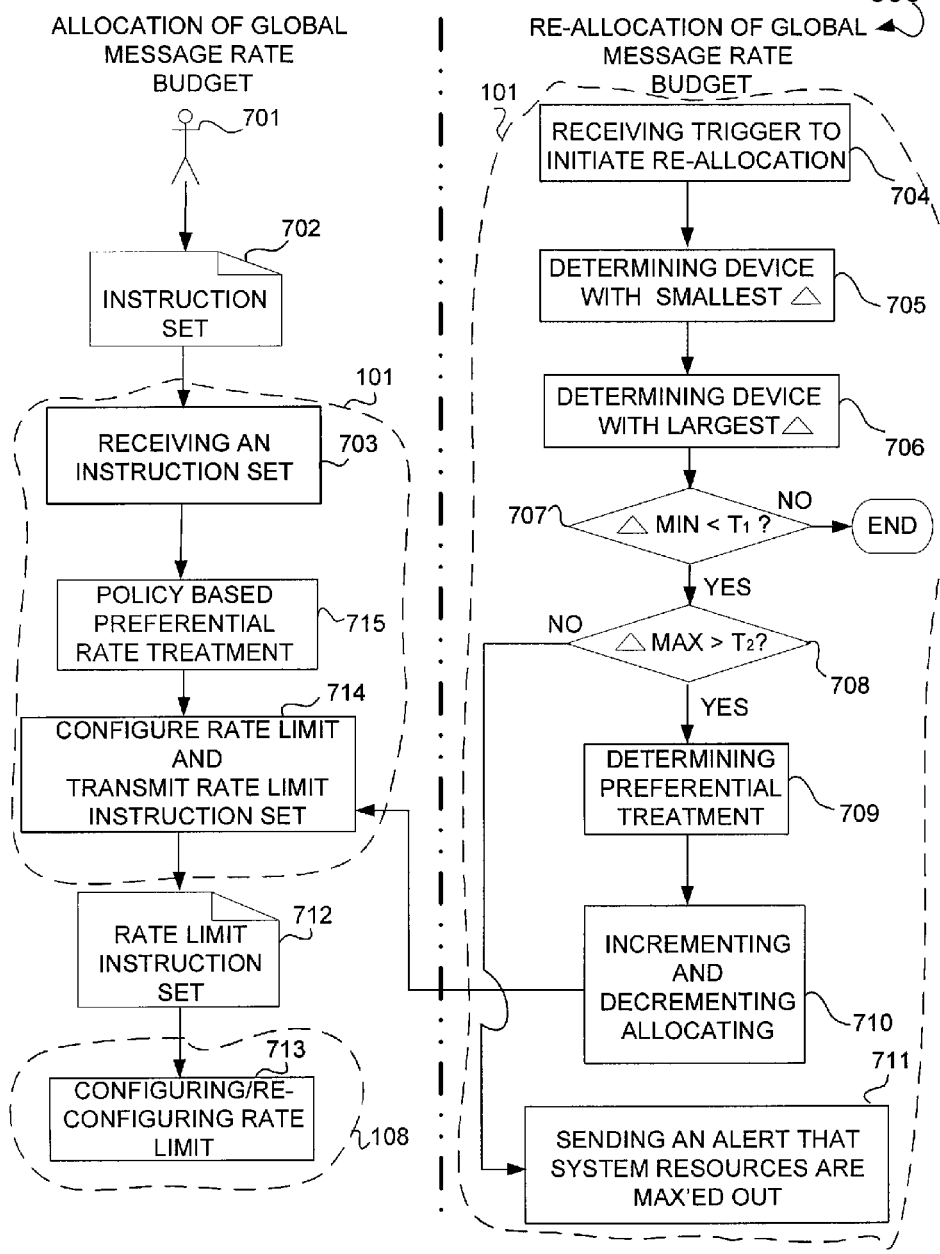
FIG. 7 is a dual-stream flowchart describing the various example methods that are used to implement a module to allocate or reallocate a global message rate budget.

FIG. 7 is a dual-stream flowchart describing the various example methods that are used to implement the module 603. A first stream titled "Allocation of Global Message Budget" contains a user 701 who generates an instruction set 702 containing instructions. This instruction set 702 may be in the form of an Extensible Mark up Language (XML) file, a flat file, or some other suitable file associated file format. Once this instruction set 702 is generated, it is provided to a module 703 that receives the instruction set and, in some embodiments, parses instruction set into its individual constituent instructions. Once these instructions are parsed, a module 715 is executed that determines whether certain devices operatively coupled to the syslog, or other server executing the instruction set 702, are to receive preferential treatment in terms of the budgets that they are to receive. That is, in some cases, a device (e.g., 106, 107, or 108) is to have a rate limit value (e.g., 304, 307, or 310) that is to remain constant, and which cannot be re-allocated. Once this determination is made, a module 714 is executed that configures a rate limit. Module 714 may be more fully describe below in the discussion relating to module 604. As a result of the execution of module 714, a rate limit instruction set 712 is generated and transmitted across a network (e.g., 102) to one of the devices (e.g., 106, 107, or 108) operative coupled to the syslog server or message server (e.g., 101 or 201). This rate limit instruction set 712 may contain instructions to configure a device (e.g., 106, 107, or 108) and the message rates limits utilized by this device. For example, the instruction set may contain instructions setting a threshold rate limit (e.g., 305, 306, or 311) for the device, and/or instructions setting a rate limit (e.g., 304, 307, or 513) for the device. The device may be responsible for configuring the sending of syslog messages based upon the instructions provided by the rate limit instruction set 712. The instruction set 702 may be received by a message server 201 and/or syslog server 101, and the modules 703, 715, and 714 may reside on this message server 201 and/or syslog server 101. Further, the rate limit instruction set 712 may be transmitted by the message server 201 and/or syslog server 101.

In some embodiments, a module 713 residing on a device such as 106, 107 or 108 may act to configure/reconfigure the various rate values. This configuration/reconfiguration process may occur through the receiving and parsing of the rate limit instruction set 712, and the use of the parsed values (e.g., a threshold rate limit value such as 305, 308, or 311, and/or a rate limit value such as 304, 307 or 310) to set or otherwise configure the device (e.g., 106, 107, or 108) to only send a certain number of messages based upon these configuration values. Put another, once a device is configured than, in some embodiments, it may throttle the number or messages it sends so as to keep under a certain rate limit value. Further, in some embodiments, no throttling may occur.

In some embodiments, a second stream of the dual-stream flow chart outlined in FIG. 7 is described. This second stream titled "Re-allocation of Global Message Rate Budget" describes various modules 704-711 that reside on a syslog server 101, or a message server 201. In some embodiments, a module 704 is implemented that receives a triggering signal from a module 602 previously referenced and described below. Once module 704 is executed, a module 705 is executed that determines the device (e.g., 106, 107, or 108) with the smallest, or among the smallest, un-utilized budget, where an un-utilized budget may be understood as the difference between the assigned rate limit (e.g., 304, 307, or 310) and the actual rate (e.g., 306, 309, or 312). Next, a module 706 is executed to determine the device (e.g., 106, 107, or 108) with the largest, or among the largest, unused budget. After a determination is made as to Δ min. (e.g., smallest difference) and Δ max. (e.g., largest difference), a decisional module 707 is executed that determines whether Δ min. is less than a first threshold limit (Ti) (e.g., 305, 308, or 311) for a device (e.g., 106, 107, or 108). Where decisional module 707 evaluates to "no", then the process ends. Where decisional module 707 evaluates to "yes", a second decisional module 708 is executed that determines whether the Δ max. is greater than the threshold rate (T2) limit (e.g., 311) for the device (e.g., 108) that requires an increase in the rate limit. Where decisional module 708 evaluates to "yes", module 709 is executed that determines whether the device (e.g., 108) is entitled to preferential treatment. In some embodiments, a module 715 may be used in lieu of module 708. Once the need for preferential treatment is determined (see e.g., the above discussion of module 715), a module 710 is executed wherein the actual rate for the device (e.g., 108) with the smallest, or among the smallest, is incremented a specific value, and the actual rate for the device or devices (e.g., 106, and 107) with the largest, or among the largest, is decremented the same specific value creating new actual rate values for the devices (e.g., 106, 107, and 108). This module 710 may be referred to as an adjustor. These new actual rate values are sent to the previously described module 714 as allocation/reallocation instructions.

Some example embodiments may include, a decisional module 708 may evaluating to "no", such that actual rates for the various devices cannot be reallocated to (e.g., re-budgeted by the syslog server 101 or message server 201). In such a scenario, a module 711 may be executed that sends out an alert that the syslog server 101 or messaging server 201 system resources are max'ed out (see e.g., FIG. 12). More to the point, additional resources (e.g., the message budget) cannot be allocated or reallocated to meet the needs of the devices served by the message server 201 or syslog server 101.

In some embodiments, an instruction set 702 is written using XML. Among other things, this instruction set provides instruction to the syslog server 101 regarding the total message budget for the syslog server, the safety margin for the syslog server, which may not be exceeded during reallocation, and a variety of other information. The following is a sample instruction set written using XML:

1 <adaptive-rule>
2 <serverMaxBudget>100000</serverMaxBudget>
3 <safetyMarginDefault>15</safetyMarginDefault>
4 <safetyMargin>
5 <percent id="B">30</percent>
6 </safetyMargin>
7 <guaranteedMinBudget>5</guaranteedMinBudget>
8 <guaranteedMinBudget>
9 <rate id="A">20</rate>
10 <rate id="C">10</rate>
11 </guaranteedMinBudget>
12 </adaptive-rule>

Line 2 is an example fixed syslog server message processing rate field representing the budgeted message processing rate of a syslog server. Line 3 is an example default safety margin field in terms of percentage. While reclaiming unused rate budget from a device, the remaining rate budget allocation for that device may still provide enough safety margin. Lines 4-6 relate to the providing of preferential treatment for a particular device. For example, line 5 is an example preferential device field granting Device "B" a larger safety margin, than other devices. The value in this field overrides the default outlined in, for example, line 3. Line 7 provides an example guaranteed minimum budget rate field, wherein the guaranteed rate budget allocation is in terms of message/second. This rate also serves as the default guaranteed budget value for each device, including newly added devices. In some embodiments, while reclaiming or reallocating unused rate budget from a device, the guaranteed rate budget has to be honored. Lines 8-11 provides an example default guaranteed minimum budget rate for certain devices (e.g., devices "A" and "C"), wherein these devices require certain amount of budget at all times. Here the budget for devices "A" and "C" (e.g., 20 k and 10 k messages per sec.) is larger than all other devices (e.g., 5 k messages per sec.).

In some embodiments, a flat file may be used to provide syslog server configuration data for an instruction set 702. In such an implementation, a delimiter may be used to distinguish different types of data. This delimiter may be any type of Universal Character Set (Unicode) or American Standard Code for Information Interchange (ASCII) character. Such a file may have the following form:
serverMaxBudget=100000;
safetyMarginDefault=15;
safetyMargin["B"]=30;
guaranteedMinBudget=5;
guaranteedMinBudget["A"]=20;
guaranteedMinBudget["C"]=10;
In the above example, a semi-colon (";") is used to delimit and distinguish one data field from another. These fields track the data fields described in the XML implementation previously described.

In some embodiments, a method is illustrated that includes monitoring at a network device an actual individual message rate of event messages sent from each one of a plurality of sending devices and received at the network device, allocating an individual message rate limit to each of the plurality of sending devices, and communicating a rate limit instruction to at least one of the sending devices to limit its transmission rate of event messages. This monitoring may, in some cases, be carried out by a module 602, and where the number of message exceeds a threshold rate limit a trigger or trigger message is sent to module 704. Additionally, the allocating may be carried out by modules 603 and 604, and the communicating may be executed by the module 714, wherein a rate limit instruction set is communicated to, for example, the module 713.

Figure 8:
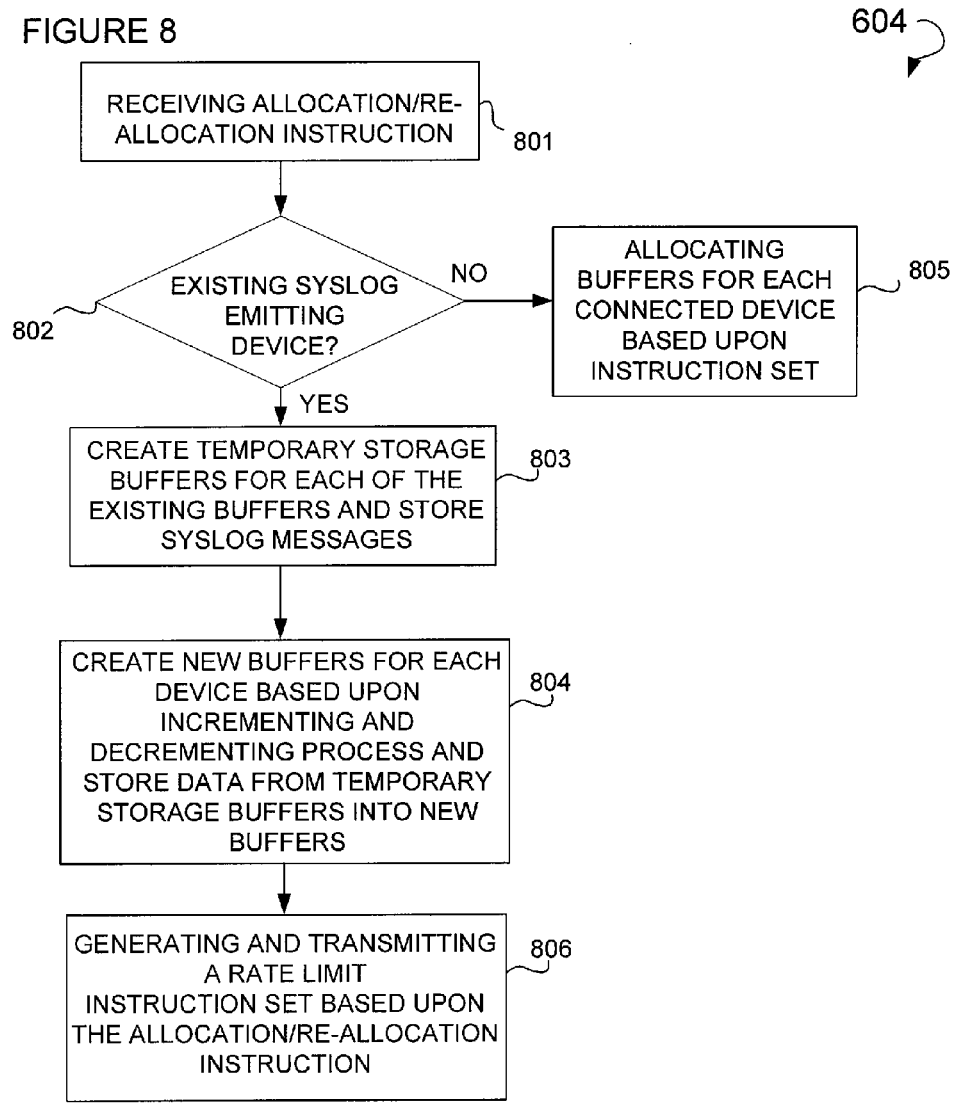
FIG. 8 is a flowchart depicting the various methods that are implemented by a module to configure the rate limit for each of the devices that are operatively coupled to the syslog server.

FIG. 8 is a flowchart depicting the various methods that are implemented by module 604. Illustrated is a module 801 that receives allocation or reallocation instructions once these instructions are received a decisional module 802 is executed wherein if the decisional module 802 evaluates to false, then a module 805 is executed that allocates a buffer for each device operatively coupled to the syslog server 101. This allocation, in some cases, may be based upon instructions provided by the instruction set 702 where the decisional module 802 evaluates to true a module 803 may be executed that creates temporary storage buffer for each of existing buffers and stores the syslog messages to the temporary buffer. Once this temporary buffer is generated a module 804 may be executed that creates a new buffer for each device operatively coupled to the syslog server 101 based upon an incrementing and decrementing process wherein once these new buffers are created the data from the buffers created by module 803 is then stored into these new buffers wherein these new buffers become the actual permanent buffers for each of the devices operatively coupled to the syslog server 101.

Figure 9:
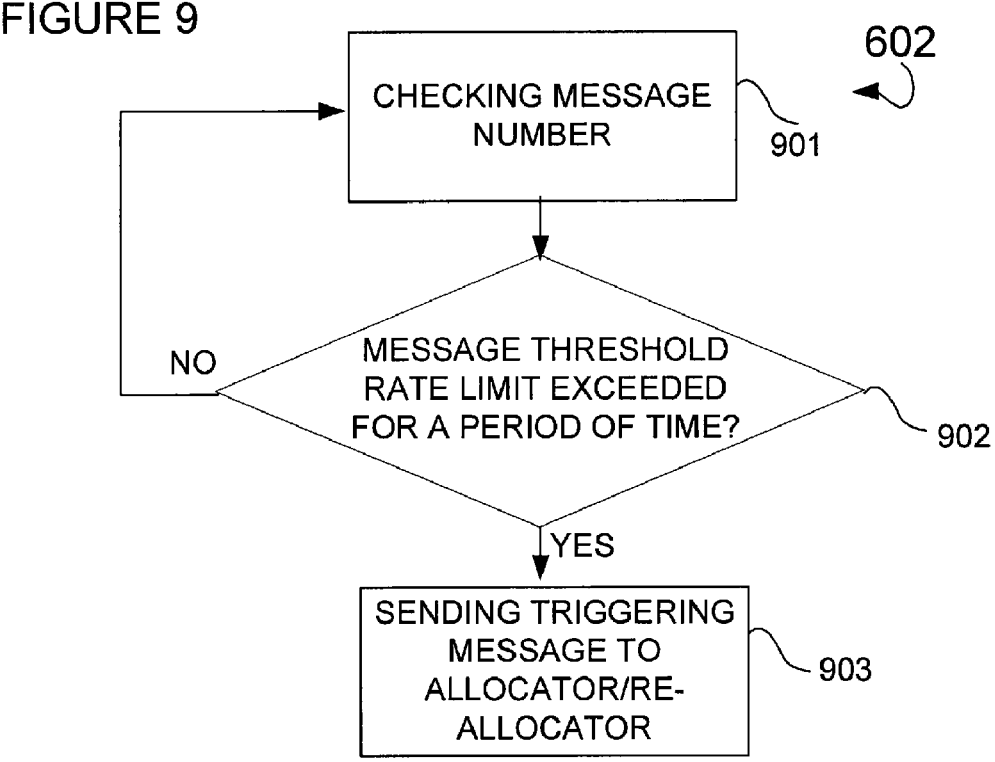
FIG. 9 is a flowchart depicting an example method that is used to implement a module to monitor the rate at which messages are received.

FIG. 9 is a flowchart depicting an example method that is used to implement module 602. Illustrated is a module 901 that checks the number of messages received and represents these messages as a numeric value. Next, a decisional module 902 is executed that determines whether or not the number of messages checked by module 901 exceeds a threshold rate limit value for a specific period of time. If decisional module 902 evaluates to "no", then a loop is formed wherein module 901 is re-executed. However, if decisional module 902 evaluates to "yes", then a module 903 is executed that sends a triggering message to the allocator or re-allocator (e.g., 603) to reallocate the global message rate budget. For example, in some cases, the threshold rate limit value (e.g., 311) is exceeded by the actual rate value (e.g., 502), thus prompting the needs for an increasing of the rate limit (e.g., 513) budget associated with the device for which the threshold rate limit was exceeded (see e.g., 108). This increase of the rate limit budget may be by way of incrementing the rate limit budget of one device (e.g., 108) at the expense of decrementing the rate limit budget of other devices (e.g., 106, and 107) operatively coupled to the syslog server or message server.

EXAMPLE IMPLEMENTATION OF A METHOD FOR REALLOCATION OF A GLOBAL MESSAGE RATE BUDGET WITHIN A SYSLOG SYSTEM

In some embodiments, a method for the reallocation of a global message rate budget is implemented. This method may be implemented using an objected-orient computer language (e.g., C++, C#, or Java) or a structured programming language (e.g., C) and certain principles of object oriented or structured software design. For example, an initialization process may implemented, wherein a first variable "B" is initialized. The variable "B" represents a fixed syslog server message processing rate, which is the budgeted message processing rate of the syslog server. Then an array or some other suitable data structure call it "b[i]" is initialized, wherein the array or data structure contains "N" numbers of devices operatively coupled to the syslog server represented by "i". This initialization process may be represented by the following pseudo code:

```
for (i = 0; i <= N; i++)
{
        Assign initial values for b[i] so that the summation
        of b[i] is less than or equal to B. The overall budget, B,
        may be distributed evenly among all the N devices served,
        or can be decided by certain policy. The policy may decide
        to reserve certain unallocated budget as to be distributed to
        newly added devices or to a device in need later on.
}
```

Once initialization occurs, then, in some embodiments, a main loop is executed to determine whether reallocation of the bandwidth budget is necessary. This reallocation process may be represented by the following pseudo code:

```
While (receiving actual rate information for each device)
{
        0. Determine the a[i] (done on an ongoing basis).
        1. Calculate the difference between b[i] and a[i], where a[i] is a data
        structure such as an array containing data relating to actual rate
        information for each device represented as "i". which is the actual.
        The rate difference, which is the unused rate budget, is d[i] for
        each device.
        2. Identify a group of devices that have the highest d[i], the unused
        rate budget.
        3. Identify a group of devices that have a low d[i].
        4. Redistribute budget from the group with the highest d[i] to the
        group with the lowest d[i]. Do so under the condition that there is a
        sufficient difference between the "high" d[i] and the "low" d[i], and
        leave the one you take budget away from still with a sufficient margin
        of safety.
        5. Check the current unused budget of each device against the safety
        margin, which is the desired spare budget of each device in terms
        of percentage of the allocated limit. For example, assuming the
        safety budget, T, is 10%, a device with d[i]/b[i] < 10% becomes
        a candidate for b[i] budget increase. The increment
        in b[i] is compensated by reducing the b[i] from the group of
        highest unused budget as identified in #2 above if the reduction
        may not cause the remaining budget to fall below the safety
        margin.
}
```

In some embodiments, devices may need to be added or removed from being operatively coupled to the syslog server 101. In those cases where a device is added, the total number of N is incremented. The rate budget b[N] is initially 0. When the device starts generating log messages, the main loop may detect the need to raise its rate budget from 0 to a value that it may have enough safety margin. When a device K is removed, the b[K] is put back to a server spare budget, to be allocated first when a device needs budget increment. This process to add or remove a device can be represented with the following pseudo code:

```
while (not program_exit)
{
        // Calculate unused budget for each device
        for (i = 0; i <= N; i++)
        {
                // Maintain a group of device with highest d[i]
                d[i] = b[i] – a[i];
        }
```

Then, check the unused budget of each device and adjust rate budget if the unused budget is below the safety margin. This may be represented with the following pseudo code:

```
for (i = 0; i <= N; i++)
{
        if ( ( d[i] / b[i]) < T )
        {
                The spare budget is below the safety margin. Decide the
                amount of rate budget increment needed to bring device i
                back within safety margin. Reduce rate budget of the group
                with most unused budget such that this may still leave
                enough safe margin, and then reallocate those reclaimed
                rate budget to device i.
        }
```

Next, where necessary, find the additional rate budget, S, that device i needs to bring its spare budget back within the safety margin. This may be represented with the following pseudo code:

```
((d[i] + S) / (b[i] + S) >= T);
S = (T * b[i] – d[i]) / (1 – T);
while ( reclaimed budget < S && there is spare budget to reclaim)
{
        Take spare rate budget from the group of highest unused budget.
}
```

Then instruct the configure rate limit module 604 to send commands to the devices to actually reclaim the spare budget. Specifically, instruct the module 604 to send the new rate budget (b[i]+S) to device i.

Sampling Component

Figure 10:
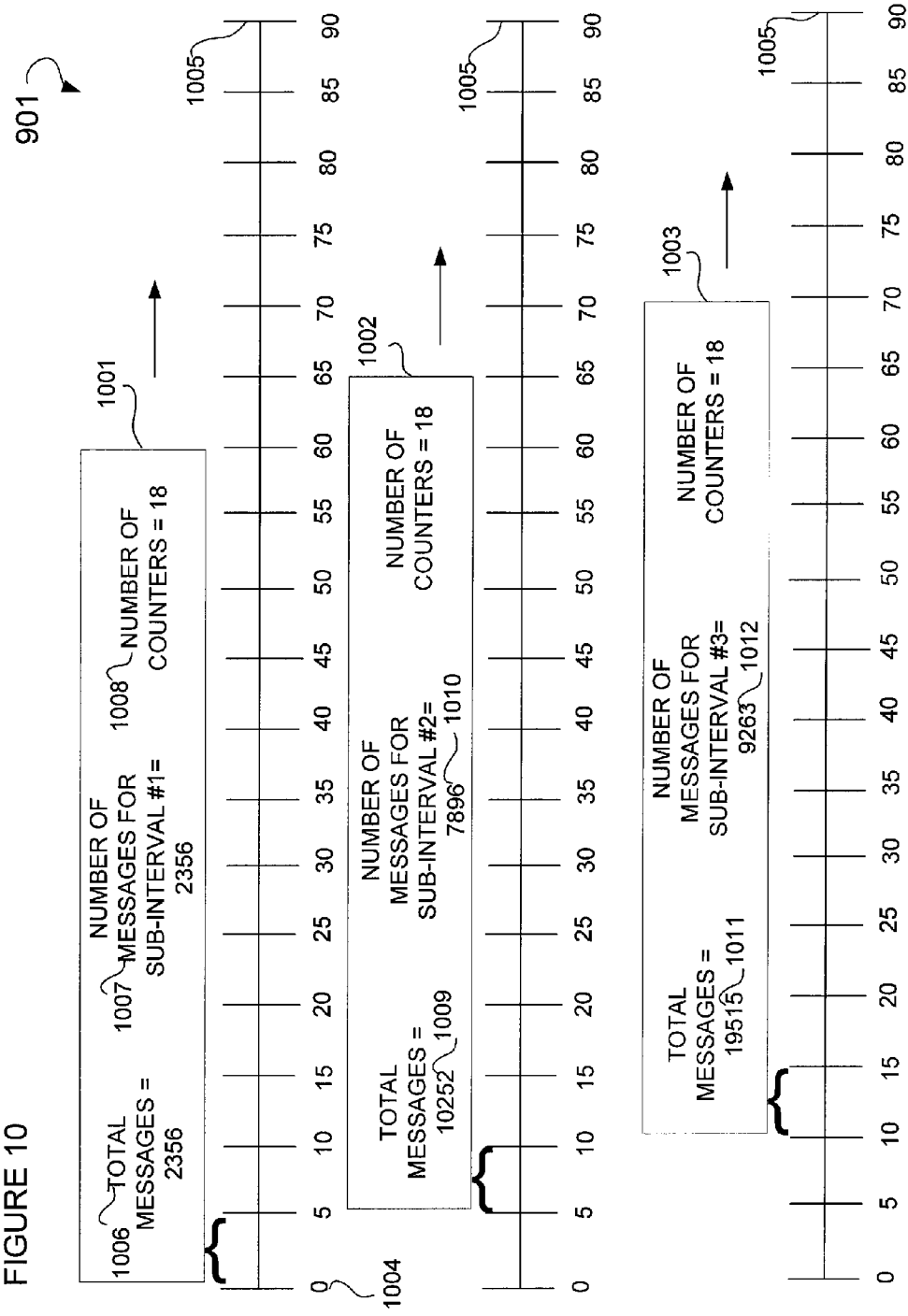
FIG. 10 is a graph describing an example sampling and monitoring component that makes up part of the module to sample and monitor the rate at which messages are received.

FIG. 10 is a graph describing an example sampling and monitoring component that makes up part of module 901. Illustrated is a windowing method wherein a sampling window is generated that samples and records bandwidth usage over some predetermined period of time. Within this method, a number of counters are maintained for particular sub-intervals of time contained within this period of time. For example, illustrated herein is a window 1001 (e.g., sub-interval) with a total message counter that equals 2356, referenced herein as 1006. Also illustrated, is a counter for the number of messages for the window 1001 which here equals 2356 and is referenced herein as 1007. Further illustrated, is a number (referenced herein as 1008) representing the number of counters (e.g., 18) for each of the sub-intervals contained within the period of time depicted by graph 1005. This window 1001 is represented as moving along this period of time wherein the values along the axis of the graph are time values starting with a time value of 0 referenced as 1004. Next, once the window moves an interval of 5 seconds a second window 1002 is generated with a message number value of 7896 (see e.g., reference number 1010) and the total message value is 10252 (see e.g., reference number 1009). After an additional 10 seconds has elapsed, a third window 1003 is illustrated with a total message value of 19515 (see e.g., reference number 1011), and a number of messages for the interval of 9263 (see e.g., reference number 1012). This windowing method allows for the detection of excessive bandwidth traffic where bandwidth exceeds some limit across multiple intervals. As described above in module 602, where the number of messages for a sub-interval exceeds some limit, a triggering message is sent to the module 603 for re-allocation of the global message rate budget. In addition to the windowing method, other possible methods for determining excess bandwidth traffic include extrapolation (e.g., linear extrapolation, conic extrapolation, or polynomial extrapolation) and the previously referenced fixed interval model.

A System of Alerting One to the Exceeding of Syslog System Resources

In certain cases, even the re-allocation of a global message rate budget may be not enough to prevent the crashing of a syslog server due to excessive syslog network traffic. In those instances, and other instances, an alert may be sent by the syslog server to, for example, a mobile device carried by, for example, a system administrator alerting them to the exhaustion of syslog server resources.

Figure 11:
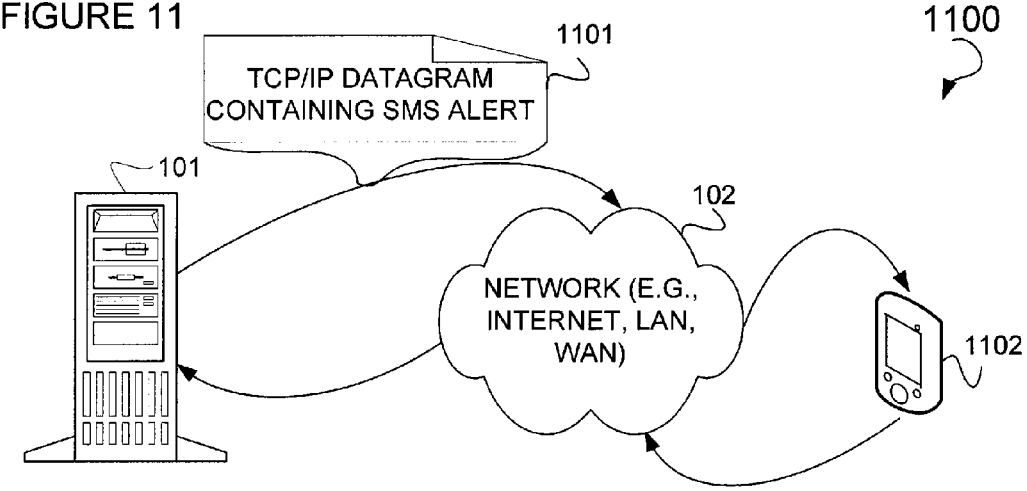
FIG. 11 is a diagram illustrating an example system for sending a syslog alert.

FIG. 11 is a diagram illustrating an example system 1100 for sending a syslog alert. Illustrated is a syslog server 1101 operatively coupled to a network 102 which, in turn, is operatively coupled to a device 1102. In some cases, this device 1102 is a Personal Digital Assistant (PDA), a cell phone or some other suitable portable device. Illustrated is a data packet 1101 in the form of a Transmission Control Protocol/Internet Protocol (TCP/IP) datagram containing a simple message system alert wherein this data packet is transmitted from the syslog server 101 across the network 102 to the device 1102. In some cases this alert is used to inform a user of the device 1102 of an increase in syslog traffic wherein the alert is a text messaged based on the Short Message Service (SMS) protocol, or Enhance Message Service (EMS) protocol. This text message may be a simple message stating "bandwidth exceeded" or more sophisticated by providing actual information regarding a specific device operatively coupled to the syslog server 1101 that has exceeded its allocated syslog bandwidth limit (e.g., a rate limit).

Figure 12:
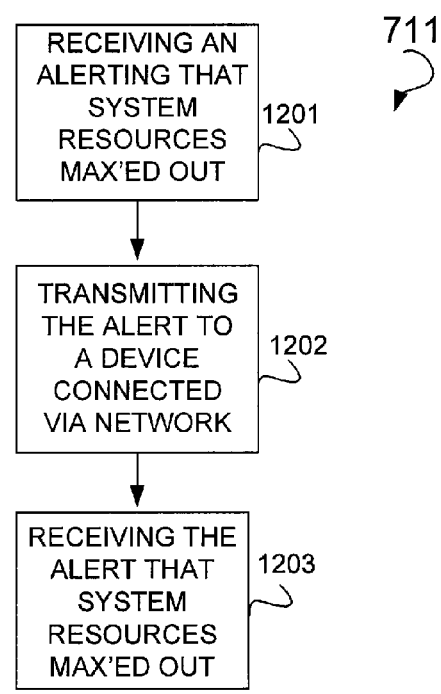
FIG. 12 is a flowchart depicting an example method used to send a syslog alert.

FIG. 12 is a flowchart depicting an example method used to implement the module 711. Illustrated as a module 1201 that receives alert the system resources or the rate limit value allocated for a particular device operatively coupled to the syslog server 101 have been exceeded or to be put another way maxed out. Once the alert is received via the module 1201 a module 1202 is executed that transmits the alert to a device such as the previously described portable device 1102 that is connected to the network 102 once transmitted a module 1203 is implemented that receives the alert that system resources, for example, a rate limit for a particular device operatively coupled to the syslog server 101 have been exceeded. In some cases, modules 1201 and 1202 may reside on a syslog server 101 whereas module 1203 may reside on a device such as a portable device 1102.

Example Embodiment of a Computer System

In some embodiments, the present invention is implemented on a digital processing system or computer system that includes a processor, which may represent one or more processors and may include one or more conventional types of such processors (e.g., x86, x86-64), such as an AMD processor, Intel Pentium processor or other suitable processor. A memory is coupled to the processor by a bus. The memory may be a Dynamic Random Access Memory (DRAM) and/or may include Static RAM (SRAM). The processor may also be coupled to other types of storage areas/memories (e.g., cache, Flash memory, disk, etc.), which could be considered as part of the memory or separate from the memory.

In some embodiments, a bus further couples the processor to a display controller, a mass memory or some type of computer-readable medium device, a modem or network interface card or adaptor, and an Input/Output (I/O) controller. In some embodiments, the display controller controls, in a conventional manner, a display, which may represent a Cathode Ray Tube (CRT) display, a Liquid Crystal Display (LCD), a plasma display, or other type of suitable display device. Computer-readable medium, in some embodiments, may include a mass memory magnetic, optical, magneto-optical, tape, and/or other type of machine-readable medium/device for storing information. For example, the computer-readable medium may represent a hard disk, a read-only or writeable optical CD, etc. In some embodiments, a network adaptor card such as a modem or network interface card is used to exchange data across a network such as an internet. In some embodiments, the I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions which are stored on a computer-readable medium or may be implemented in a combination of software and hardware, or in certain embodiments, entirely in hardware.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage medium such as RAM, ROM, Erasable Programmable Read-Only Memory (EPROM), CD-ROM or other optical-disk storage, magnetic-disk storage or other magnetic-storage devices, or any other medium which can be used to carry or store desired program code means in the form of computer-executable instructions, computer-readable instructions, or data structures and which may be accessed by a general-purpose or special-purpose computer system. This physical storage medium may be fixed to the computer system as in the case of a magnetic drive or removable as in the case of an Electronically Erasable Programmable Read-Only Memory (EEPROM) device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or PDA) where internal modules (e.g., a processor and memory) work together to perform operations on electronic data.

In some embodiments, the invention may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The invention can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

Figure 13:
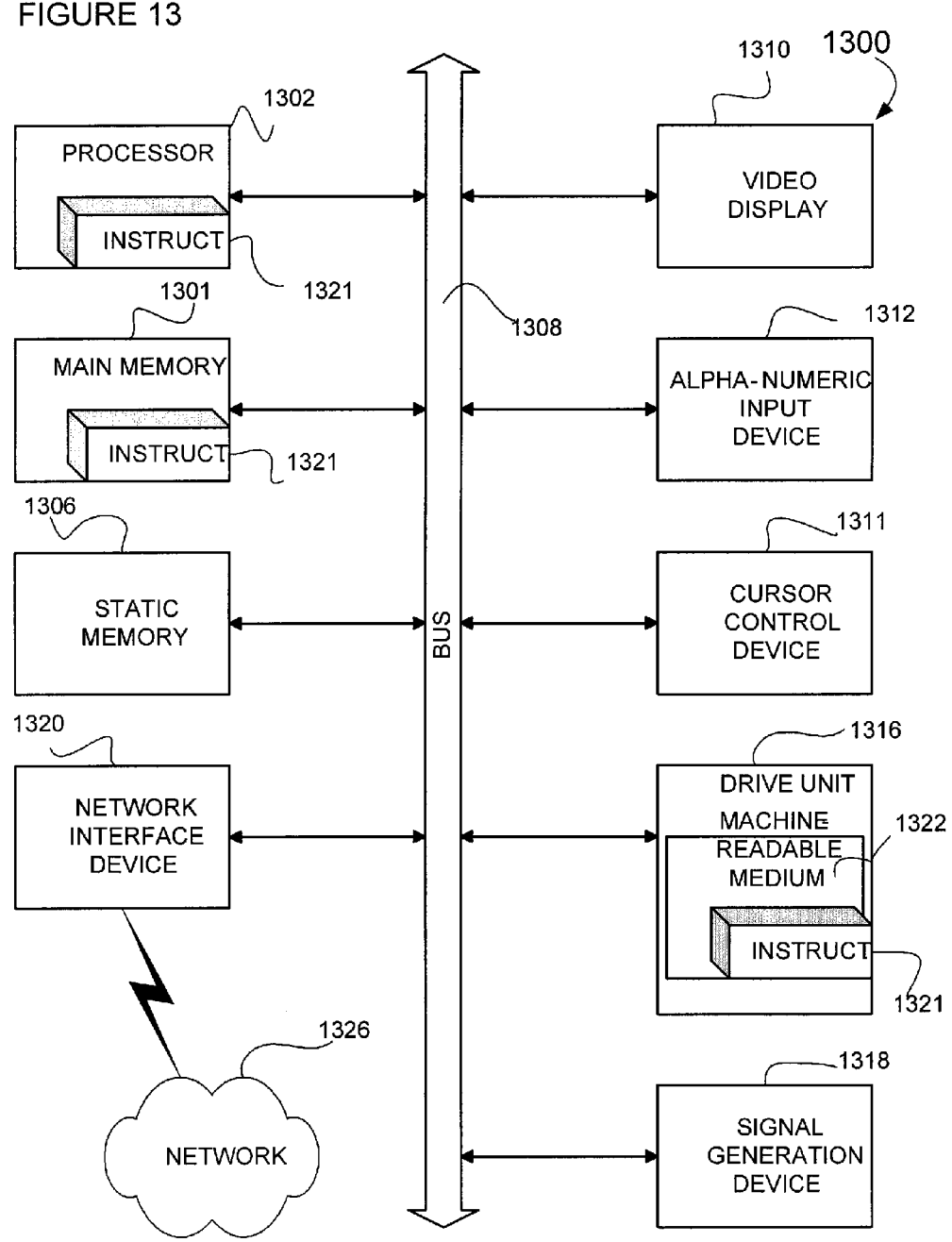
FIG. 13 shows a diagrammatic representation of machine in the example form of a computer system.

FIG. 13 shows a diagrammatic representation of machine in the example form of a computer system 1300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a Central Processing Unit (CPU), a Graphics Processing Unit (GPU) or both), a main memory 1301 and a static memory 1306, which communicate with each other via a bus 1308. The computer system 1300 may further include a video display unit 1310 (e.g., a LCD or a CRT). The computer system 1300 also includes an alphanumeric input device 1312 (e.g., a keyboard), a user interface (UI) cursor controller 1311 (e.g., a mouse), a disk drive unit 1316, a signal generation device 1318 (e.g., a speaker) and a network interface device (e.g., a transmitter) 1320.

The disk drive unit 1316 includes a machine-readable medium 1322 on which is stored one or more sets of instructions and data structures (e.g., software) embodying or utilized by any one or more of the methodologies or functions described herein. The software may also reside, completely or at least partially, within the main memory 1301 and/or within the processor 1302 during execution thereof by the computer system 1300, the main memory 1301 and the processor 1302 also constituting machine-readable media.

The instructions 1321 may further be transmitted or received over a network 1326 via the network interface device 1320 utilizing any one of a number of well-known transfer protocols (e.g., Hyper-Text Transfer Protocol (HTTP), Session Initiation Protocol (SIP)).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical media and magnetic media.

Some example embodiments may include the above described software modules being implemented into the system on an as-needed basis. These modules may be written in an object-oriented-computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM) or other suitable technique. These modules may be linked to other modules via various APIs and then compiled into one complete server and/or client application. The process for using modules in the building of client and server applications is well known in the art.

In some embodiments, a system is described as including an allocator residing on a server, to allocate a global message rate budget to one or more devices operatively coupled to the server, and a transmitter residing of the server to transmit a rate limit instruction set to the one more devices operatively coupled to the server, wherein the rate instruction set configures the one or more devices by establishing a rate limit value that may not be exceeded. Moreover, the system may further include a receiver residing on the server to receive a trigger message to re-allocate a rate limit from a first device operatively coupled to the server, a first calculator residing on the server to determine the first device with a smallest remaining budget, a second calculator residing on the server to determine a second device operatively coupled to the server with the largest remaining budget, an incrementor residing on the server to increment a rate limit for the first device a decrementor residing on the server to decrement a rate limit for the second device, and a configuror residing on the server to configure the rate limit for the first device and the second device. Additionally, the system may further include a checker residing on the server to monitor an actual message rate, and a trigger residing on the server to transmit the trigger message, where the number of messages from the first device exceeds a threshold rate limit, wherein the messages are syslog messages. Moreover, the system may additionally include the decrementor residing on the server to decrement based upon a determination of preferential treatment for the second device operatively coupled to the server. Additionally the system may include a device operatively coupled to the server through a network connection to receive an alert that server resources cannot be reallocated to meet an actual traffic rate emanating from the first device operative coupled to the server, wherein the traffic is syslog message traffic. Moreover, the system may include a receiver residing on the server to receive an instruction set to configure the server, wherein the instruction set is written using an XML.

Some example embodiments may include a method comprising allocating a global message rate budget to one or more devices operatively coupled to the server, and transmitting a rate limit instruction set to the one more devices operatively coupled to the server, wherein the rate instruction set configures the one or more devices by establishing a rate limit value that may not be exceeded. Moreover, the method may additionally include receiving a trigger message to re-allocate a rate limit from a first device, calculating the first device with a smallest remaining budget, calculating a second device with the largest remaining budget, incrementing a rate limit for the first device, decrementing a rate limit for the second device, and configuring the rate limit for the first device and the second device. Additionally, the method may include monitoring an actual message rate, and sending the trigger message, where the number of messages from the first device exceeds a threshold rate limit, wherein the messages are syslog messages. Further, the method may include decrementing based upon a determination of preferential treatment for the second device operatively coupled to the server. Moreover, the method may include receiving an alert that server resources cannot be reallocated to meet an actual traffic rate emanating from the first device operative coupled to the server, wherein the traffic is syslog message traffic. In addition, the method may include comprising configuring the server using an instruction set, wherein the instruction set is written using an XML.

In some embodiments, an apparatus is described as including means for allocating a global message rate budget to one or more devices operatively coupled to the server, and means for transmitting a rate limit instruction set to the one more devices operatively coupled to the server, wherein the rate instruction set configures the one or more devices by establishing a rate limit value that may not be exceeded.

Some example embodiments may include logic encode in one or more tangible media for execution and when executed operable to allocate a global message rate budget to one or more devices operatively coupled to the server, and transmit a rate limit instruction set to the one more devices operatively coupled to the server, wherein the rate instruction set configures the one or more devices by establishing a rate limit value that may not be exceeded.

Some embodiments may include a network device that includes a rate monitor to monitor an actual individual message rate of event messages sent from each one of a plurality of sending devices operatively in communication with the network device, an allocator to allocate an individual message rate limit to each of the plurality of sending devices, and a communication module to communicate a rate limit instruction to at least one of the sending devices, the rate limit instruction to limit the transmission rate of event messages, wherein each of the plurality of sending devices communicates with the network device, and a sum of the individual message rate limits for each of the plurality of sending devices is equal to a global message rate associated with the network device. Further, the sum of the individual message rate limits may be equal to the global message rate, and the individual message rate limit is a maximum message transmission rate permissible by an associated sending device. Additionally, this network device may further include a receiver residing on the network device to receive a trigger message to re-balance a message rate limit relating to a first sending device, at least one processor residing on the network device to identify the first sending device with a smallest remaining budget and to identify a second sending device with a largest remaining budget, and a rate adjustor responsive to the allocator and being configured to increment the individual message rate limit for the first sending device and to decrement the individual message rate limit for the second sending device, wherein the event messages are syslog messages and the individual message rate is a transmission rate of the syslog messages. Additionally, the rate adjustor may be configured to adjust the individual message rate limit based upon a priority associated with the sending device. This network device may further include a receiver residing on the network device to receive an instruction set to configure the network device to control allocation of the individual message rate limits, wherein the instruction set is an XML instruction set. This network device may also be a server configured to process syslog messages.

In some embodiments, a method is described as including monitoring at a network device an actual individual message rate of event messages sent from each one of a plurality of sending devices and received at the network device, allocating an individual message rate limit to each of the plurality of sending devices, and communicating a rate limit instruction to at least one of the sending devices to limit its transmission rate of event messages. Further, the sending devices may communicate with the network device, and a sum of the individual message rate limits for each of the plurality of sending devices is equal to a global message rate associated with the network device, where the sum of the individual message rate limits is equal to the global message rate. Additionally, the individual message rate limit may have a maximum message transmission rate permissible associated with a sending device. This method may further include receiving a trigger message to re-balance an individual message rate limit relating to a first sending device, identifying the first sending device with a smallest remaining budget and identifying a second sending device operatively coupled to the network device with the largest remaining budget, incrementing the message rate limit for the first sending device, and decrementing a message rate limit for the second sending device, wherein the event messages are syslog messages and the individual message rate is a transmission rate of the syslog messages. Moreover, the method may also include adjusting the individual message rate limit based upon a priority associated with the sending device. In addition, the method may further include receiving an instruction set to configure the network device, and controlling allocation of the individual message rate limits based on the instructions set, wherein the instruction set is an XML instruction set.

Some embodiments may include an apparatus comprising means for monitoring at a network device an actual individual message rate of event messages sent from each one of a plurality of sending devices and received at the network device, means for allocating an individual message rate limit to each of the plurality of sending devices, and means for communicating a rate limit instruction to at least one of the sending devices to limit its transmission rate of event messages.

Some embodiments may include a computer readable medium embodying instructions which, when executed on a computer, cause the computer to monitor an actual individual message rate of event messages sent from each one of a plurality of sending devices operatively in communication with the network device, allocate an individual message rate limit to each of the plurality of sending devices, and communicate a rate limit instruction to at least one of the sending devices, the rate limit instruction to limit the transmission rate of event messages.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72 (b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A network device comprising:
   a rate monitor to dynamically monitor an actual individual message rate of event messages sent from each one of a plurality of sending devices operatively in communication with the network device, the event messages being sent from the respective sending devices to the network device for processing by the network device, the actual individual message rate indicating a number of event messages per time period;
   an allocator to adaptively allocate an individual message rate limit to each of the plurality of sending devices, to maintain a global event message rate of event messages received from the plurality of sending devices at or below a global message rate budget that is lower than a processing capacity of the network device for processing incoming event message, adaptive allocation of the individual message rate limits being responsive to dynamic monitoring of the actual individual message rate of event messages by the rate monitor; and
   a communication module to communicate a rate limit instruction to at least one of the sending devices based respectively on an associated individual message rate limit allocated by the allocator, the rate limit instruction to limit the transmission rate of event messages.

2. The network device of claim 1, wherein each of the plurality of sending devices communicates with the network device, and a sum of the individual message rate limits for each of the plurality of sending devices is equal to the global message rate budget associated with the network device.

3. The network device of claim 1, wherein the individual message rate limit is a maximum message transmission rate permissible by an associated sending device.

4. The network device of claim 1, further comprising:
   a receiver residing on the network device to receive a trigger message to re-balance a message rate limit relating to a first sending device;
   at least one processor residing on the network device to identify the first sending device with a smallest remaining budget and to identify a second sending device with a largest remaining budget; and
   a rate adjustor responsive to the allocator and being configured to increment the individual message rate limit for the first sending device and to decrement the individual message rate limit for the second sending device.

5. The network device of claim 1, wherein the event messages are syslog messages and the individual message rate is a transmission rate of the syslog messages.

6. The network device of claim 4, wherein the rate adjustor is configured to adjust the individual message rate limit based upon a priority associated with the sending device.

7. The network device of claim 1, further comprising a receiver residing on the network device to receive an instruction set to configure the network device to control allocation of the individual message rate limits.

8. The network device of claim 7, wherein the instruction set is an Extensible Markup Language (XML) instruction set.

9. The network device of claim 1, further comprising a server configured to process syslog messages.

10. A method comprising:
    dynamically monitoring at a network device an actual individual message rate of event messages sent from each one of a plurality of sending devices and received at the network device, the event messages being sent from the respective sending devices to the network device for processing by the network device, the actual individual message rate indicating a number of event messages per time period;
    adaptively allocating, using one or more processors, an individual message rate limit to each of the plurality of sending devices, to maintain a global event message rate of event messages received from the plurality of sending devices at or below a global message rate budget that is lower than a processing capacity of the network device for processing incoming event messages, adaptive allocation of the individual message rate limits being responsive to the dynamic monitoring of the actual individual message rate of event messages; and
    communicating a rate limit instruction to at least one of the sending devices based respectively on an associated individual message rate limit allocated thereto, to limit its transmission rate of event messages.

11. The method of claim 10, wherein each of the sending devices communicates with the network device, and a sum of the individual message rate limits for each of the plurality of sending devices is equal to the global message rate budget associated with the network device.

12. The method of claim 10, wherein the individual message rate limit is a maximum message transmission rate permissible by an associated sending device.

13. The method of claim 10, further comprising:
receiving a trigger message to re-balance an individual message rate limit relating to a first sending device;
identifying the first sending device with a smallest remaining budget and identifying a second sending device operatively coupled to the network device with the largest remaining budget;
incrementing the message rate limit for the first sending device; and
decrementing a message rate limit for the second sending device.

14. The method of claim 10, wherein the event messages are syslog messages and the individual message rate is a transmission rate of the syslog messages.

15. The method of claim 14, further comprising adjusting the individual message rate limit based upon a priority associated with the sending device.

16. The method of claim 10, further comprising:
receiving an instruction set to configure the network device; and
controlling allocation of the individual message rate limits based on the instructions set.

17. The method of claim 16, wherein the instruction set includes as least one of an Extensible Markup Language (XML) instruction set, or a flat file instruction set.

18. A non-transitory computer readable medium embodying instructions which, when executed on a computer, cause the computer to:
dynamically monitor an actual individual message rate of event messages sent from each one of a plurality of sending devices operatively in communication with the network device, the event messages being sent from the respective sending devices to the network device for processing by the network device, the actual individual message rate indicating a number of event messages per time period;
adaptively allocate, using one or more processors, an individual message rate limit to each of the plurality of sending devices, to maintain a global event message rate of event messages received from the plurality of sending devices at or below a global message rate budget that is lower than a processing capacity of the network device for processing incoming event messages, adaptive allocation of the individual message rate limits being responsive to the dynamic monitoring of the actual individual message rate of event messages; and
communicate a rate limit instruction to at least one of the sending devices based respectively on an associated individual message rate limit allocated thereto, the rate limit instruction to limit the transmission rate of event messages.

* * * * *

UNITED STATES PATENT AND TRADEMARK OFFICE
CERTIFICATE OF CORRECTION

PATENT NO. : 8,305,895 B2
APPLICATION NO. : 11/691385
DATED : November 6, 2012
INVENTOR(S) : Chang et al.

It is certified that error appears in the above-identified patent and that said Letters Patent is hereby corrected as shown below:

In column 17, line 64, in Claim 1, delete "message" and insert --messages--, therefor In column 19, line 27, in Claim 17, delete "as" and insert --at--, therefor Signed and Sealed this
Twelfth Day of March, 2013

Teresa Stanek Rea
*Acting Director of the United States Patent and Trademark Office*